United States Patent [19]

Vu

[11] Patent Number: 4,859,735
[45] Date of Patent: Aug. 22, 1989

[54] CASTOR OIL BASED POLYURETHANE FOR BRIDGE DECKINGS AND RELATED APPLICATIONS

[75] Inventor: Cung Vu, Columbia, Md.

[73] Assignee: W. R. Grace & Co.-Conn., New York, N.Y.

[21] Appl. No.: 245,869

[22] Filed: Sep. 16, 1988

[51] Int. Cl.$^4$ ............................................. C08L 75/04
[52] U.S. Cl. ................................ 524/780; 427/388.1; 427/388.3; 427/393; 428/423.1; 428/425.1; 428/425.5; 524/788; 524/789; 525/130; 528/54; 528/58; 528/65
[58] Field of Search .......... 524/780, 788, 789; 525/130; 528/54, 58, 65; 427/388.1, 388.3, 393; 428/423.1, 425.1, 425.5

[56] References Cited

U.S. PATENT DOCUMENTS

| | | | |
|---|---|---|---|
| 3,310,533 | 3/1967 | McElroy | 260/77.5 |
| 3,515,699 | 6/1970 | Burns et al. | 260/75 |
| 3,725,355 | 4/1973 | Parrish et al. | 260/77.5 |
| 3,748,315 | 7/1973 | Sidney et al. | 260/75 |
| 3,933,759 | 1/1976 | Hoeschele | 260/77.5 |
| 3,939,222 | 2/1976 | Dieterich | 260/858 |
| 3,941,855 | 3/1976 | Ehrhard | 260/77.5 |
| 4,049,636 | 9/1977 | Mao et al. | 260/77.5 |
| 4,066,397 | 1/1978 | Carroll | 8/192 |
| 4,081,429 | 3/1978 | Wyman et al. | 260/77.5 |
| 4,101,473 | 7/1978 | Lander | 260/13 |
| 4,124,573 | 11/1978 | Watabe et al. | 528/53 |
| 4,131,604 | 12/1978 | Szycher | 528/79 |
| 4,145,515 | 3/1979 | Pogozelski et al. | 528/77 |
| 4,225,696 | 9/1980 | Colpitts et al. | 528/76 |
| 4,376,834 | 3/1983 | Goldwasser et al. | 521/159 |
| 4,400,497 | 8/1983 | Blum et al. | 528/45 |
| 4,404,258 | 9/1983 | Loewrigkeit et al. | 428/424.6 |
| 4,433,128 | 2/1984 | Wick | 528/53 |
| 4,436,862 | 3/1984 | Tetenbaum et al. | 524/445 |
| 4,436,896 | 3/1984 | Okamoto et al. | 156/332 |
| 4,507,336 | 3/1985 | Cenegy | 427/244 |
| 4,520,042 | 5/1985 | Smith | 427/209 |
| 4,532,316 | 7/1985 | Henn | 528/59 |
| 4,551,498 | 11/1985 | Yeater et al. | 524/424 |
| 4,554,188 | 11/1985 | Holubka et al. | 427/393.5 |
| 4,559,239 | 12/1985 | Cenegy | 427/140 |
| 4,567,230 | 1/1986 | Meyer | 524/786 |
| 4,604,445 | 8/1986 | Kay et al. | 528/64 |
| 4,680,203 | 7/1987 | Maki et al. | 427/393.6 |
| 4,689,268 | 8/1987 | Meader, Jr. | 428/413 |

FOREIGN PATENT DOCUMENTS 927642 6/1973 Canada.
1182884 9/1968 United Kingdom.

OTHER PUBLICATIONS

Mobay brochure entitled "Desmophen 1150" (1986).
Encyclopedia of Polymer Science and Technology, vol. 3, p. 25 (1965).
Encyclopedia of Polymer Science and Technology, vol. 11, p. 514 (1969).
Brochure "Bayer Engineering Polymers": (11/85).
Technical brochure on "352-Oldopren-S" (3/83).
Article-"Field Performance of Experimental Bridge Deck Membrane Systems in Vermont"; Trans. Res. Record p. 57-65 (1984), R. I. Frascoia.
Article-A. L. Meader, Jr. et al; "Development of a Cold-Poured Bridge Deck Membrane System" ASTM Special Technical Publications N. 629, pp. 164-177 (1976).
Article by M. D. McDonald-"Concrete Bridge Deck Waterproofing Systems: in Highways and Road Construction", pp. 26-30 (8/73).
Arco brochure entitled "Poly bd ® resins in Urethane Elastomers".
Technical Bulletin "Hycar Reactive Liquid Polymers"; B. F. Goodrich Co. (7/86).
Urethane Plastic Products, vol. 7, #8, pp. 5-8 (Aug. 1987).
An undated Italian Mazazine article from the publication *Pitture E Vernici*, pp. 26-29.
An undated Italian Magazine article from the publication *Pitture E. Vernici* vol. 12, pp. 27-32.

*Primary Examiner*—Maurice J. Welsh
*Attorney, Agent, or Firm*—Charles A. Cross; W. W. McDowell, Jr.

[57] ABSTRACT

Novel polyurethane formulations especially useful as membranes of the protection of bridge deckings. The polyurethane is prepared by mixing two components, A and B. Component A comprises castor oil modified with a ketone-formaldehyde condensate and also preferably contains an elastomer. Component B is a modified MDI, being a mixture of diphenylmethane diisocyanate and its reaction product with a low molecular weight poly(oxyalkylene).

40 Claims, No Drawings

4,859,735

CASTOR OIL BASED POLYURETHANE FOR BRIDGE DECKINGS AND RELATED APPLICATIONS

RELATED APPLICATIONS

Copending applications having U.S. Ser. No. 101,215, filed Sept. 25, 1987, now 4,804,734 and U.S. Ser. No. 141,452, fi 198 and U.S. Ser. No. 209,406 filed May 19, 1988 also disclose polyurethane resins used for the purposes related to those described herein.

FIELD OF THE INVENTION

The invention relates to polyurethane coatings used for the protection of exterior surfaces, especially concrete surfaces.

BRIEF SUMMARY OF THE INVENTION

A novel polyurethane resin is applied to exterior surfaces, especially concrete surfaces subject to stress due to vehicular traffic, weather, temperature-induced dimensional changes, and the like. This resin is especially useful as a coating for concrete bridge deckings where asphalt is to be laid on the decking. The resin is applied as a mixture of two components, viz., (A) a polyol component and (B) a modified MDI (diisocyanate) component.

Component A consists essentially of (i) modified castor oil plus (ii) optionally an elastomer. Component B is a mixture of MDI with a prepolymer comprising the reaction product of MDI and an alkylene oxide. Either Component A or B may include a polyurethane catalyst.

BACKGROUND OF THE INVENTION

Concrete bridge deckings are commonly coated with a protective layer of asphalt (up to 15 cm thick), uniformly spread under heavy rolling equipment, which may weigh 10 metric tons or more. This asphalt layer is exposed to extremes of weather throughout the year, and will eventually develop cracks, some so small as to be practically invisible, others much larger. All are harmful, in that they permit liquid water to penetrate down to the concrete surface, where it freezes in winter and causes sizable portions of the asphalt layer to spall away. These adverse factors (freeze-shattering, traffic impact, chloride disintegration from de-icing salt, etc.) result in serious damage to the concrete traffic surface and eventually require major repairs.

Aside from asphalt-coated concrete surfaces, bridge concrete in the form of superstructure, parapets, crash barriers, etc., is also subject to attack, viz., from air- or moisture-borne industrial chemicals; spattered de-icing salt; and carbonation, i.e., gradual penetration of atmospheric carbon dioxide which then reacts with the alkaline materials in the concrete and attacks reinforcement in the concrete.

To inhibit the aforesaid destruction, it is conventional in concrete bridge construction and maintenance to apply a bridge deck membrane (BDM) to the concrete surface before laying down asphalt. Several BDM's are available. Polyurethane has been tried.

A BDM should meet a number of technical and economic criteria. It should:

(1) be impermeable to liquid water from above, yet be sufficiently permeable to permit small amounts of water vapor to escape from the concrete substrate;
(2) be solventless;
(3) be easily applied, preferably sprayable;
(4) have good adhesion to concrete;
(5) have low chloride penetration;
(6) be stable to concrete alkali;
(7) be stable under conditions of asphalt application - hard, but not brittle, yet be sufficiently flexible to cope with dimensional changes generated by temperature differentials and bridge movements; be able to tolerate application of asphalt at 170° C under a 10-ton roll;
(8) provide superior adhesion of asphalt as applied to the BDM;
(9) be resistant to asphalt migration (i.e., tendency of low molecular weight hydrocarbons in asphalt to migrate into the BDM, weakening and/or destroying it).
(10) have competitive raw material costs;
(11) not discolor concrete;
(12) have prolonged life on exposed surfaces (e.g., vertical surfaces and other surfaces not asphalt-coated);
(13) be tough enough within a reasonable time for construction crews to walk on it.

PRIOR ART

An undated technical brochure entitled "Desmophen", available from Mobay Chemical Co., describes "Desmophen" ® as a "branched polyalcohol with ether and ester groups" which is suitable for the production of coating compositions. In particular, the brochure discloses that Desmophen ® can be reacted with isocyanates (not defined) to make polyurethane coatings for concrete and that the coating formulation must include molecular sieve zeolites "for thorough drying" (p. 12). The coating may also include fillers. The coating is said to be hard and moisture resistant. There is no teaching of added elastomers. Prior to use on concrete, a primer is applied to the concrete (p. 13). The polyurethane coating may be applied to cast asphalt floorings and to steel and "bridge structures" (p. 14). Our analyses indicate that "Desmophen" contains castor oil, cyclohexanone formaldehyde condensate, and a small amount of toluene.

Castor oil is known as a polyol reactant with diisocyanates to form urethanes. Ency. Pol. Sci. and Techn. 3, 25 (1965).

In a brochure entitled "Bayer Engineering Polymers: (apparently dated November, 1985), Bayer UK Limited offers commercially a polyurethane mad from a polyether polyol (Component A) and a modified MDI (Component B). No further disclosure of the composition is given. The two components are mixed at the site, e.g., by spraying, on bridge decking or other concrete surface. The applied resin is said to cure tack-free in a few minutes and can be walked on in 20–30 minutes.

In a technical brochure on " 352-Oldopren-S"(apparently dated March, 1983), Buesing & Fasch GmbH & Co. of Oldenburg, Germany, describe an MDI-based 2-component, polyurethane that provides an elastic film, useful (under asphalt) on road- and bridge-concrete surfaces.

R. I. Frascoia describes the use of four polyurethane membranes in bridge deck systems in an article, "Field Performance of Experimental Bridge Deck Membrane Systems in Vermont", Transportation Research Record, pp. 57–65 (1984). Three of the polyurethanes were asphalt-modified, but formulations are not otherwise given. The bond between bituminous pavement and membrane was rated "Poor", but overall performance was rated "Fair to Good".

Use of an "asphalt-extended urethane membrane" is described in an article by A. L. Meader, Jr. et al, "Development of a Cold-Poured Bridge Deck Membrane System", ASTM Special Technical Publications N 629, pp. 164–177 (1976).

For a good review article, especially for UK practice, see M. D. McDonald, "Concrete Bridge Deck Waterproofing Systems: in Highways and Road Construction, pp. 26–30 (August 1973). According to the article, polyurethane is blended with pitch to improve low-temperature flexibility and to reduce raw material costs; the membrane may need an epoxy primer (on concrete) and may need a surface protective layer before rolling on the final asphalt coating. "Cracking" and "chisel" tests are described.

An undated brochure, "Poly bd ® Resins in Urethane Elastomers", released by Arco Chemical Co., discloses dihydroxyl-terminated polybutadiene and its reaction with aromatic diisocyanates. Page 3 of the brochure discloses a polybutadiene, "R-45HT", with structural formula, indicating the molecular weight to be about 2,800. (The use of this polybutadiene is illustrated in Examples 1 and 2 below.)

In a technical bulletin "Hycar Reactive Liquid Polymers" released by B. F. Goodrich Co. (apparently dated March, 1981), Hycar polymer is described as an acrylonitrile-based diol that can be reacted with MDI to provide low temperature flexibility and chemical resistance.

U.S. Pat. No. 4,608,203 (1987) discloses a polyurethane coating for bridge concrete, prepared from polyols and MDI. The polyols can be a mixture of poly(propylene oxide) (col. 1, line 65), glycerine (col. 2, line 3), and acrylonitrile-butadiene copolymer (col. 2, line 35).

U.S. Pat. No. 4,689,268 (1987) discloses a 3-layer laminate on concrete, viz., epoxy resin plus filler, a bonding agent, and a polyurethane.

U.S. Pat. No. 4,559,239 (1985) describes a 2-component (polyol-MDI) polyurethane applicable to concrete.

U.S. Pat. No. 3,725,355 discloses glycerine, polyether polyol, and an isocyanate prepolymer. The polyol can be a triol and must have a molecular weight of at least 2,000.

U.S. Pat. No. 4,507,336 (1985) describes a 2-component ("A" and "B") polyurethane, sprayable as a roof coating. "A" is (e.g.) a liquid modified MDI plus a chlorinated paraffin; "B" comprises (e.g.) a polypropylene glycol, 1,4-butanediol, and dibutyltin dilaurate catalyst.

U.S. Pat. No. 4,567,230 discloses use of molecular sieves as moisture absorbers in polyurethane resins.

U.K. Pat. No. 1,182,884, Gruber and Fehlbier (1970) describes treatment of castor oil with cyclohexanone formaldehyde condensate, thereby providing modified castor oil as used herein. Reaction of the modified castor oil with MDI to make a polyurethane resin is also disclosed.

Canadian Pat. No. 927,642 (1973) describes applying a polyurethane foam directly to a roadbed (not to concrete), followed by a bitumen layer on the polyurethane foam.

The combination of MDI and poly(propylene oxide) triol is disclosed, e.g., in U.S. Pat. Nos 3,515,699, 4,532,316, and 4,604,445.

DESCRIPTION OF CERTAIN COMPONENTS

Modified Castor Oil

Castor oil is a well-known commercial product. It contains (depending on source) about 85 - 90% ricinoleic triglyceride, with small amounts of the glycerides of other fatty acids, e.g., oleic and linoleic. Solvent-extracted castor oil may contain small amounts of solvent, e.g., 1% toluene. The castor oil used in this invention can be any of those commercially available and is treated with cyclohexanone-formaldehyde condensate as described in U.K. Patent 1,182,884, above cited. In the examples herein, the amount of cyclohexanone condensate is about 3% of the total weight of castor oil and condensate. In lieu of cyclohexanone-formaldehyde condensate, other ketone-formaldehyde polymers are useful, and in varying amounts, as described in U.K. 1,182,884. Modified castor oil as described herein is commercially available.

Modified MDI

Modified MDI as used herein can be made by reacting together diphenylmethane 4,4'- or 2,4'-diisocyanate (MDI) with a poly(oxypropylene) glycol of the formula:

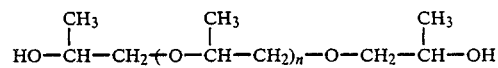

The value of n lies, approximately, between 0 and 3 indicating that the material is a mixture, probably with small amounts of higher and lower molecular weight polymers of the same genus. In the main reaction the MDI end-caps both ends of the poly(oxypropylene) glycol. The prepolymer thus formed may also contain small amounts of other products of the reaction, containing isocyanate and/or hydroxyl groups. The prepolymer is typically K-O-$(CH_2CH[CH_3]O)_m$-K where K is

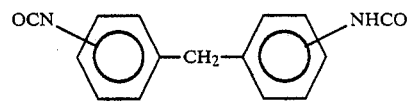

and m is about 2–5. In general, this material may be described as an MDI/polyisocyanate material comprising about 45–50 weight % MDI with the balance being the described prepolymer, i.e., with some prepolymer molecules being relatively small and others larger (depending generally on the amount of capped polyoxypropylene), but with the averages being substantially as above enumerated.

Instead of poly(oxypropylene) glycol, oxyethylene and oxybutylene homologs can be used with similar results.

Whereas MDI is a solid, and is very difficult to handle in spray apparatus, the above described MDI/polyisocyanate prepolymer is a homogeneous liquid and is readily sprayed.

Elastomers

Hycar 1300×17 is a long chain acrylonitrilebutadiene hydroxyl-terminated diol (copolymer with 17% acrylonitrile) available from BF Goodrich Co., Cleveland, Ohio. Weight average molecular weight is about 4,000, viscosity, 140,000 cp; hydroxyl number, 25 mg KOH/g; residual carboxyl acid number, 3.9.

Poly bd ® is a liquid dihydroxy-terminated polybutadiene, molecular weight about 2,800, available from Arco Chemical Co., as above described.

DETAILED DESCRIPTION OF THE INVENTION

My polyurethane resin is formed basically of two components identified, for the sake of brevity, as (A) and (B). (A) comprises polyols, and (B) comprises polyisocyanate.

(A) consists essentially of (i) modified castor oil as above and, optionally, (ii) an elastomer preferably, but not necessarily, with functional groups such as hydroxyl, amino, active hydrogen, etc., capable of reacting with polyisocyanate, suitably an elastomeric diol.

The elastomer can be one of the following: natural rubber, epoxidized natural rubber, ethylene-propylene rubber, nitrile rubber, styrene-butadiene rubber, acrylic elastomers, butyl rubber, chlorosulfonated polyethylene, neoprene, polybutadiene, polyisoprene, and the like. I prefer polybutadiene (such as Poly bd ® 45HT, as above described) or an acrylonitrile-butadiene copolymer (such as Hycar 1300×17, as above described).

The elastomer functions in at least two ways. First, it provides flexibility to the polyurethane membrane in a manner that permits the membrane to flex under the continuous flow of heavy traffic, month after month, without cracking. Secondly, it provides flexibility which is maintained even at sub-zero temperatures.

Component B is a modified MDI, viz., a mixture of MDI with a prepolymer made by reacting MDI with a lower alkylene oxide (2-4 carbons). MDI is diphenylmethane diisocyanate. It is available commercially, e.g., as a mixture of isomers, typically mixtures comprising mostly the 4,4'-isomer, with the balance of the 2,2'-isomer. For example, MDI (as the 2,4'- or 4,4'-isomer, or a mixture) can be reacted with an alkylene oxide to make an MDI prepolymer. As the alkylene oxide I prefer ethylene or propylene oxide. Especially useful as Component B is a modified MDI containing about 45-50 weight % 4,4'- and/or 2,4'-diphenylmethane, with the balance to make 100% being a polyisocyanate prepolymer of the structure $K\text{-}O\text{-}(CH_2CH[CH_3]O)_m\text{-}K$, where K is

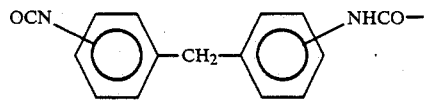

and m is about 2-5. Prepolymer polyisocyanates of this type are available as Mondur XP-744 (Mobay), Isonate 181 (Dow Chemical Co.), etc.

Catalyst/No Catalyst

My formulations can be used with or without a catalyst, depending on the method of the application. If the formulation is sprayed or otherwise applied in such manner that the two components are admixed at the point of application, a catalyst may be desirable to ensure quick setting, i.e., dry-to-touch within minutes. On the other hand, where the components are mixed in a container, and the container is required to supply the complete polyurethane formulation over a period of time (say, 30 minutes), then not only is a catalyst inadvisable, but an inhibitor may actually be necessary for the desired extended pot life. A number of polyurethane inhibitors are known, including: organic and inorganic acids, such as benzoyl chloride, p-toluene sulfonic acid, formic acid, acetic acid, benzoic acid, phosphoric acid, hydrochloric acid, and the like.

When an inhibitor is used, it is suitably about 0.01-1.0 weight % of the overall polyurethane mix.

A catalyst is recommended for spraying operations or where the formulation is to be applied to concrete immediately on mixing. For this purpose, substantially any of the conventional polyurethane catalysts (and combinations) can be used. These catalysts include:

Tertiary amines:
  Triethylene diamine
  N-methyl morpholine
  N-ethyl morpholine
  Diethyl ethanolamine
  1-methyl-4-dimethylamino ethyl piperazine
  3-methoxy-N-dimethyl propyl amine
  N-dimethyl-N'-methyl isopropyl propylene diamine
  N,N-diethyl-3-diethyl amino propylamine
  N,N-dimethyl benzyl amine
  Dicyclohexylmethylamine
  2,4,6-tris dimethylaminomethylphenol
  N,N-dimethyl cyclohexylamine
  Triethylamine
  Tri-n-butylamine
  1,8-diaza-bichloro[5,4,0]-undecene-7
  N-methyl diethanolamine
  N,N-dimethyl ethanolamine
  N,N-dimethyl cyclohexylamine
  N,N,N'N'-tetramethyl-ethylene diamine
  1,4-diaza-bicyclo-[2,2,2]-octane
  N-methyl-N'-dimethylaminoethyl-piperazine
  Bis-(N,N-diethylaminoethyl)-adipate
  N,N-diethylbenzylamine
  Pentamethyldiethylene triamine
  N,N,N'-tetramethyl-1,3-butanediamine
  1,2-dimethylimidazole
  2-methylimidazole
Tin compounds:
  Stannous chloride
  Dibutyl tin di-2-ethyl hexoate
  Stannous octoate
  Dibutyl tin dilaurate
  Trimethyl tin hydroxide
  Dimethyl tin dichloride
  Dibutyl tin diacetate
  Dibutyl tin oxide
  Tributyl tin acetate
  Tetramethyl tin
  Dimethyl dioctyl tin
  Tin ethyl hexoate
  Tin laurate
  Dibutyl tin maleate
  Dioctyl tin diacetate
Other metal organics:
  Zinc octoate
  Phenyl mercuric propionate
  Lead octoate
  Lead naphthenate
  Copper naphthenate As to the amount of catalyst(s), the preferred amount of tertiary amine catalyst is about 0.001-0.5%, based on the total weight of polyols plus polyisocyanate. When using a tin compound or other metal-containing catalyst, an equal amount is suitable. Mixtures of tertiary amines and organo-metallics are particularly suitable as catalysts for this invention. Suitable ratios for certain components are:

TABLE I

|  | Workable Ranges Parts by Wt. | Preferred Ranges Parts by Wt. |
| --- | --- | --- |
| Component A |  |  |
| Modified Castor oil | about 90 to 140 | about 100 to 130 |
| Elastomer | about 0 to 120 | about 20 to 100 |
| Molecular sieves | 0 to 50 | about 5 to 40 |
| Component B |  |  |
| Modified MDI | about 50 to 70 | about 55 to 65 |

Generic and preferred embodiments of the invention include:
(1) the novel combination of Components A and B as set forth in generic and specific formulations herein;
(2) the processes (generic and specific) of mixing together Components A and B aforesaid;
(3) the resins (generic and specific) resulting from (2) above;
(4) process of coating a substrate with the resins of (3) above. Substrates of particular interest are metals and concrete, e.g., bridge decking.
(5) coated metal or concrete articles resulting from (4) above;
(6) overall process of protecting metals or concrete bridge decking by applying the resins of (3) above to metals or concrete, as the case may be;
(7) as an article, bridge decking comprising concrete-polyurethane-asphalt laminate, the polyurethane being the resin of (3) above.

Mixing and Application

For small batches, such as might be needed for minor repair work to decks and parapets, the two Components A and B can be mixed in an open container at room temperature, and the mixture can then be spread on the concrete surface. To extend pot life, it may be desirable to eliminate the catalyst, or even to use an inhibitor. For general large scale work (and the resin is designed for this) a conventional two-liquid air spray gun is recommended for best results.

Application to the deck surface is suitably made at ambient temperature, preferably above freezing. The coated substrate is rapidly tack-free and cures at ambient temperature.

It is preferred that the resin be applied to a dry surface. However, some dampness can be tolerated. Following conventional practice, I prefer to spray the surface with a primer.

I prefer to apply about 1–5 kg resin/meter$_2$ of surface. I can apply this as one, or, suitably, two or more coats. This makes a film of about 1–5 mm thickness. For deckings subject to extremely heavy traffic, I prefer the upper levels of these ranges.

The following examples are merely illustrative and are not to be construed in any way to limit the scope of the claimed invention.

EXAMPLE 1

This represents a preferred embodiment of the invention. A polyurethane coating was prepared from two components, A and B, in parts by weight given as about:

|  | Parts |
| --- | --- |
| Component A |  |
| Castor oil modified according to claimed invention | 100.0 |
| Polybutadiene (Poly BD) | 30.0 |
| Molecular sieve (Baylith L) | 6.0 |
| CaCO$_3$ | 27.0 |
| Cr$_2$O$_3$ | 2.0 |
| fumed silica (R-202) | 1.0 |
| dibutyl tin dilaurate (DBTDL) | 0.1 |
| DABCO LV-33 from Air Products (67% polypropylene glycol, 33% triethylene diamine) | 0.3 |
| Component B |  |
| Polyisocyanate Prepolymer (Mobay's Mondur XP-744) | 60.0 |

The ingredients listed under Component A were mixed to form Component A, which was then mixed with Component B. Reaction occurred instantaneously. The resulting polyurethane can be sprayed or doctored onto concrete or other substrates. The coating cures within minutes. Tests show that the coating is very hard and adheres well to concrete. It has a particular advantage in that it is hydrophobic and resists reaction with moisture, thereby greatly diminishing formation of bubbles in the coating.

EXAMPLE 2

The above ingredients were formulated and used to produce the claimed invention, except that XP-744, the polyisocyanate prepolymer used for component B, was substituted one for one in parts by weight with Isonate 181 (Dow Chemical Co.).

COMPARISON EXAMPLE 1

For comparison purposes, several runs have also been made in which component A only comprises castor oil. However, the resulting polyurethanes were too soft for serious consideration as a BDM.

Fillers in the above formulations (e.g., molecular sieves and fumed silica) assist in viscosity control of the liquid polyurethane, aid in levelling the coating, and act as moisture absorbers. (See, e.g., U. S Pat. No. 4,567,230, supra.) The moisture comes not from the resin, but rather from the underlying concrete and from the atmosphere. Even well-cured concrete tends to release water vapor, which tends to form blisters in BDM's, especially in freshly laid membranes. The demoisturizing fillers can, however, be omitted, with acceptable results.

In the general case, and especially in humid conditions, molecular sieves should be added to the formulation when it is to be sprayed. The spray droplets tend to absorb atmospheric moisture, and this moisture reacts with the polyisocyanate to release carbon dioxide, which causes foaming in the membrane with consequent severe deterioration of properties in the cured membrane. Molecular sieves inhibit this foaming by absorbing moisture before it can react with the polyisocyanate component. When molecular sieves (or equivalent moisture absorber) is used, a suspending (thixotropic) agent is preferably used to maintain the molecular sieves in suspension. These materials are well known and are available commercially.

It is expected that the coatings of this invention will meet the following tests.

Tests derived from the British Board of Agreement(B.-B.A.):
  Water vapor permeability (similar to ASTM E-96, Method B).
  Resistance to chloride ion.
  Resistance to cracking.
  Resistance to water penetration (similar to ASTM E-96).
  Resistance to chisel impact.
  Resistance to ball indentation.
  Resistance to aggregate indentation.
  Tensile bond (adhesion)
Test originating in laboratories outside the B.B.A.:
  Asphalt migration.
  Certain of the above tests are summarized below.

So far as I am aware, there are no official requirements (whether at the national or state level) for polyurethane or other BDM's. However, the construction industry has come to expect certain properties, and the chemical industry has attempted to meet these expectations. Such parameters have on occasion been offered as guidelines, as distinct from requirements. In general, the tests, however, defined and formulated, aim at demonstrating properties that meet practical problems of actual road use, as elsewhere delineated. Some of the tests have been developed by official agencies (e.g., the British Board of Agreement), some by the construction industry, some by the American Society for Testing Materials (ASTM), and some by suppliers of polyurethane components.

The following is a summary of the tests which were conducted on the claimed invention. These tests were based on those found in Appendix B, Department of Transport Checks and Tests for the Approval of Waterproofing Systems for Concrete Decks to Highway Bridges, published by the British Board of Agreement, and is current as of 1987:

(1) Water vapor permeability. (Test per British Standards 3177:1959.) Permeability of water at 25° C and 75% relative humidity should not exceed 15 g/m²/day.

(2) Resistance to chloride ion. Concentrated NaCl solution on upper side of membrane, distilled water on lower. After 7 days no Cl ion penetration as shown by silver nitrate added to lower container.

(3) Resistance to cracking. Concrete slab is coated, then pressure applied incrementally at a rate of 0.2 mm/min from the other side to crack the slab. It is desirable, and a pass is bestowed, if the crack in the slab reaches 2.5 mm before fracturing the coating to create a visible 12 mm-long fracture in the coating. If more than 1 crack appears in the concrete, then any cracks in the coating should be less than 25mm.

(4) Resistance to water penetration. Samples supported on gauze are subjected to 6,010 kg/m² water pressure for 24 hours without penetration.

(5) Resistance to chisel impact. Total of 40 impacts, at 20° C and 0° C, with a chisel weighing 1 kg, with head 20 mm wide and 90° tip angle, dropped from a height of 200 mm in guides. Aim is less than 5% punctures. The damage caused by each impact is recorded to a specific scale. Mean of all drops must be less than or equal to 3 and the % of impacts in categories 4 or 5 must be less than 5%.

(6) Tensile bond. 150 mm square samples of coating are applied to concrete blocks, then steel plates are adhered to the coating's upper surface by using an epoxy or similar adhesive. Load required to pull the membrane from the concrete should not be less than 1,200 N (7.73 psi).

(7) Resistance to indentation (ball). A 200 mm ×200 mm sample of coating was bonded to a steel plate, and then a 20 mm diameter steel ball pressed into the sample for 5 minutes at 1800 N. A further test was conducted wherein a 5 mm ball was pressed into the sample at 400 N. Penetration to the plate is determined by addition of salt solution to the indentation and attempted passage of electric current (1,000 v) therethrough. Even with replications, the polyurethane should not be penetrated.

(8) The Aggregate indentation test was formerly listed in the B.B.A., but is no longer used. However, the following summary is provided for historical purposes. 150 mm square sample of polyurethane on concrete slab is topped with a layer of 14–22 mm crushed granite aggregate and a load of 5,625 kg is applied for 5 minutes. The polyurethane should not be penetrated.

The following is a tabulation of the results achieved by the coating compositions described in the preceding Examples.

TABLE II

| Test Criteria As numbered above | Details | Examples #1 | #2 |
|---|---|---|---|
| #1 | Moisture vapor transmission | P | P |
| #2 | Resistance to chloride ions | P | P |
| #3 | Resistance to cracking at 0° and 20° C. At 0° C.: | | |
| | crack in concrete (mm) = 0.5 | P | P |
| | 1.0 | P | P |
| | 2.0 | P | P |
| | 2.5 | P | P |
| #4 | Resistance to water penetration | P | P |
| #5 | Chisel impact at: | | |
| | 0° C. | 1.9 | 2.0 |
| | 20° C. | 2.5 | 1.8 |
| #6 | Tensile Bond on Concrete | | |
| | 1 day at 25° C. (psi) | 16.2 | 21.3 |
| | 28 days at 70° C. (psi) | 27.8 Test stopped | 27.8 Test stopped |
| #7 | Resistance to indentation | | |
| | Condition 1: 1800 N on 20 mm ball | P | P |
| | Condition 2: 400 N on 5 mm ball | P | P |

TABLE II-continued

| Test Criteria | | Examples | |
|---|---|---|---|
| As numbered above | Details | #1 | #2 |
| #8 | Aggregate indentation | P | P |

NOTE:
P = Pass; F = Fail

Other Tests

Additional tests were conducted to illustrate other advantageous properties of the claimed invention. For instance, as mentioned earlier, membrane degradation resulting from water and chloride and alkali ions is always a concern for road materials. The following test results indicate excellent properties in this area as well.

| Test | Details and Requirements | #1 | #2 |
|---|---|---|---|
| #9 | Resistance to water degradation | | |
| | 1 day at 70° C. | | |
| | Tensile strength, psi | 1680 | 1900 |
| | Elongation, % | 212 | 174 |
| | Weight gained/loss, % | 5.3 | 0.08 |
| | 7 day at 70° C. | | |
| | Tensile strength, psi | 1710 | 1840 |
| | Elongation, % | 247 | 192 |
| | Weight gained/loss, % | 0.33 | 0.53 |
| | 28 days at 70° C. | | |
| | Tensile strength, psi | 1380 | 1800 |
| | Elongation, % | 189 | 190 |
| | Weight gained/loss, % | −1.4 | 1.4 |
| #10 | Resistance to Chloride degradation | | |
| | 1 day at 70° C. | | |
| | Tensile strength, psi | 1920 | 1850 |
| | Elongation, % | 231 | 134 |
| | Weight gained/loss, % | 0.15 | 0.01 |
| | 7 day at 70° C. | | |
| | Tensile strength, psi | 1690 | 1950 |
| | Elongation, % | 224 | 174 |
| | Weight gained/loss, % | −0.34 | −0.38 |
| | 28 days at 70° C. | | |
| | Tensile strength, psi | 1910 | 2010 |
| | Elongation, % | 199 | 187 |
| | Weight gained/loss, % | −0.62 | 1.065 |
| #11 | Resistance to alkali degradation | | |
| | 1 day at 70° C. | | |
| | Tensile strength, psi | 1800 | 1980 |
| | Elongation, % | 236 | 172 |
| | Weight gained/loss, % | 0.08 | 0.19 |
| | 7 day at 70° C. | | |
| | Tensile strength, psi | 1650 | 1970 |
| | Elongation, % | 264 | 188 |
| | Weight gained/loss, % | 0.44 | 0.69 |
| | 28 days at 70° C. | | |
| | Tensile strength, psi | 1910 | 1880 |
| | Elongation, % | 199 | 192 |
| | Weight gained/loss, % | −0.16 | 1.2 |

As illustrated above, little change in properties were experienced in the above tests after subjecting the claimed membrane to 70° C for 1, 7 and 28 days respectively. It should be noted that by subjecting the membrane to degradation conditions for 28 days at 70° C the membrane underwent the equivalent of at least 5 years of degradation conditions.

Asphalt Migration

A coupon is dipped with 2 mm-polyurethane coating in asphalt at 175° C for 1 hour. After recovery of the coupon, it is determined by visual inspection whether asphalt has migrated into the polyurethane, or whether the coating is embrittled, discolored, or otherwise deteriorated. Both samples #1 and #2 passed this test with no migration.

Some of these tests point to seemingly contradictory requirements; for example, the perfect membrane should be tough and hard, permitting the overlay of hot asphalt by heavy equipment, but at the same time the membrane must be sufficiently flexible and elastic so that if the underlying concrete cracks, the membrane will not likewise crack. Perhaps the perfect membrane does not exist. Our preferred formulations, on the other hand, are expected to meet major requirements.

Besides molecular sieves and thixotropic agents, we can also add antioxidants, reinforcing agents, plasticizers, UV stabilizers, pigments, fillers, and corrosion inhibitors, in amounts ranging from about 0.01 to 25% by weight of the total composition.

Percentages are by weight unless otherwise stated.

I claim:

1. Composition consisting essentially of two separate components, A and B, wherein in parts by weight
    Component A consists essentially of (i) about 90–140 parts ketone-formaldehyde modified castor oil and (ii) about 0–120 parts elastomer; and
    Component B consists essentially of about 50–75 parts a mixture comprising diphenylmethane diisocyanate and the reaction product of diphenylmethane diisocyanate (MDI) with an alkylene oxide of 2–4 carbons.

2. Composition according to claim 1, wherein Component B, comprises about 45–50% by weight 4,4,-or 2,4,-diphenylmethane and the balance to make 100%, a polyisocyanate of the structure K-O-(CH2CHO)m-K, wherein K is

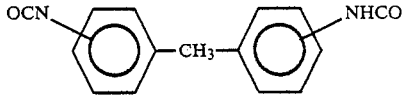

and m is about 2–5.

3. Composition according to claim 1, wherein the castor oil is modified with about 3% cyclohexanone formaldehyde condensate, the elastomer is polybutadiene or an acrylonitrile-butadiene copolymer; and the weight ratio of modified castor oil: elastomer: component B is about 90–140: 0–120: 50–75.

4. Composition according to claim 3 wherein the respective weight ratio is 100-130:20-100:55-65.

5. Composition according to claim 1 wherein in addition Component A comprises at least one additive selected from the group consisting of polyurethane catalyst, polyurethane inhibitor, molecular sieves, thixotropic agents, anti-oxidants, reinforcing agents, plasticizers, UV stabilizers, pigments, fillers, and corrosion inhibitors.

6. Composition according to claim 5 wherein the additive is molecular sieves.

7. Composition according to claim 5 wherein the weight ratio of modified castor oil: elastomer: Component B: additive is 90-140:0-120:50-75:0-50.

8. Composition according to claim 7 wherein the respective weight ratio is 100-130: 20-100: 55-65: 10-40.

9. Composition according to claim 3, 4, or 5 wherein Component B comprises about 45-50 weight % of 4,4'- or 2,4'-diphenylmethane and the balance, to make 100%, a polyisocyanate of the structure K-O-(CH$_2$CH[CH$_3$]O)$_m$-K, wherein K is

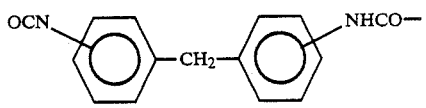

and m is about 2-5.

10. Composition according to claim 1 wherein, in parts by weight,
Component A consists essentially of:
  about 100.0 parts modified castor oil,
  about 30.0 parts polybutadiene
  about 6.0 parts molecular sieves in castor oil, 1:1,
  27.0 parts CaCO$_3$
  2 0 parts Cr$_2$O$_3$
  1.0 parts fumed silica
  0.1 parts dibutyl tin dilaurate, and
  0.3 parts composition comprising about 70% polypropylene glycol and about 30% triethylene diamine (DABCO); and
Component B consists essentially of about 60.0 parts modified MDI, said modified MDI having the structure K-O-(CH$_2$CH[CH$_3$]O)$_m$-K, wherein K is

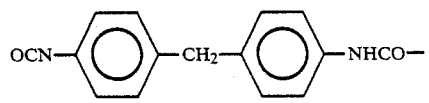

and m is about 2-5.

11. Polyurethane resin, wherein said resin is the product obtained from the reaction of Component A and Component B as defined in claim 1.

12. Polyurethane resin according to claim 11 wherein Components A and B are as defined in claim 2.

13. Polyurethane resin according to claim 11 wherein Components A and B are as defined in claim 5.

14. Polyurethane resin according to claim 11 wherein components A and B are defined in claim 10.

15. Process of forming a polyurethane resin comprising mixing together two components, A and B, as defined in claim 1.

16. Process according to claim 15 wherein Components A and B are as defined in claim 2.

17. Process according to claim 15 wherein Components A and B are as defined in claim 5.

18. Process according to claim 15 wherein Components A and B are as defined in claim 10.

19. Process of coating a substrate comprising applying thereto a resin as defined in claim 11.

20. Process according to claim 19 wherein the resin is that of claim 12.

21. Process according to claim 19 wherein the resin is that of claim 13.

22. Process according to claim 19 wherein the resin is that of claim 14.

23. Process according to claim 19, 20, 21 or 22 herein the substrate is concrete.

24. Process according to claim 19, 20, 21 or 22 wherein the substrate is metal.

25. Process according to claim 23 wherein the concrete is bridge decking.

26. Article comprising a substrate and a film coating adhered thereon, said film coating comprising the resin of claim 11.

27. Article according to claim 26 wherein the film coating comprises the resin of claim 12.

28. Article according to claim 26 wherein the film coating comprises the resin of claim 13.

29. Article according to claim 26 wherein the film coating comprises the resin of claim 14.

30. Article according to claim 26, 27, 28 or 29 wherein the substrate is concrete.

31. Article according to claim 26, 27, 28 or 29 wherein the substrate is metal.

32. Article according to claim 30 wherein the concrete substrate is bridge decking.

33. Process of protecting a concrete bridge decking from damage due to traffic, road salt, weather, and associated injury-sources, wherein a polyurethane membrane comprising a resin as defined in claim 11 is applied to the surface of the concrete decking followed by an asphalt layer.

34. Process according to claim 33 wherein the polyurethane membrane comprises a resin as defined in claim 12.

35. Process according to claim 33 wherein the polyurethane membrane comprises a resin as defined in claim 13.

36. Process according to claim 33 wherein the polyurethane membrane comprises a resin as defined by claim 14.

37. Article comprising concrete bridge decking having a layer of polyurethane resin- as defined in claim 11 applied thereon, and a layer of asphalt on the resin layer.

38. Article according to claim 37 wherein the resin is the resin of claim 12.

39. Article according to claim 37 wherein the resin is the resin of claim 13.

40. Article according to claim 37 wherein the resin is the resin of claim 14.

* * * * *

UNITED STATES PATENT AND TRADEMARK OFFICE
CERTIFICATE OF CORRECTION

PATENT NO. : 4,859,735

DATED : August 22, 1989

INVENTOR(S) : Cung Vu

It is certified that error appears in the above-identified patent and that said Letters Patent is hereby corrected as shown below:

Claim 2, column 12, line 43 change

"K-O-(CH2CHO)m-K" to

-- $K-O-(CH_2CH[CH_3]O)_m-K$ --

Signed and Sealed this

Fifteenth Day of October, 1991

Attest:

HARRY F. MANBECK, JR.

*Attesting Officer*      *Commissioner of Patents and Trademarks*